(12) United States Patent
Wentzel

(10) Patent No.: US 10,337,489 B2
(45) Date of Patent: Jul. 2, 2019

(54) METHOD AND SYSTEM FOR ENERGY CONVERSION FROM A FLOW OF FLUID

(71) Applicant: SeaQurrent Holding B.V., Grou (NL)

(72) Inventor: Youri Wentzel, Grou (NL)

(73) Assignee: SeaQurrent Holding B.V., Grou (NL)

( * ) Notice: Subject to any disclaimer, the term of this patent is extended or adjusted under 35 U.S.C. 154(b) by 0 days.

(21) Appl. No.: 15/574,494

(22) PCT Filed: May 18, 2016

(86) PCT No.: PCT/NL2016/050353
§ 371 (c)(1),
(2) Date: Nov. 16, 2017

(87) PCT Pub. No.: WO2016/186498
PCT Pub. Date: Nov. 24, 2016

(65) Prior Publication Data
US 2018/0128238 A1 May 10, 2018

(30) Foreign Application Priority Data

May 18, 2015 (NL) ..................................... 2014816
May 18, 2015 (NL) ..................................... 2014817

(51) Int. Cl.
*F03B 13/00* (2006.01)
*F03B 13/10* (2006.01)
(Continued)

(52) U.S. Cl.
CPC .............. *F03B 15/02* (2013.01); *F03B 13/10* (2013.01); *F03B 13/264* (2013.01); *F03B 17/06* (2013.01);
(Continued)

(58) Field of Classification Search
CPC ........ F03B 15/02; F03B 13/10; F03B 13/264; F03B 17/06; F03B 17/062
(Continued)

(56) References Cited

U.S. PATENT DOCUMENTS

| 6,229,225 B1 * | 5/2001 | Carroll | F03B 13/10 |
| | | | 290/42 |
| 6,273,680 B1 * | 8/2001 | Arnold | F03B 17/00 |
| | | | 416/1 |
| 9,006,919 B2 * | 4/2015 | Lynch | F03B 17/06 |
| | | | 290/54 |
| 10,036,365 B2 * | 7/2018 | Grubel | F03B 13/264 |

(Continued)

FOREIGN PATENT DOCUMENTS

| WO | WO 80/10705 | 8/1980 |
| WO | WO 2007/139412 | 12/2007 |
| WO | WO 2009/097000 | 8/2009 |

OTHER PUBLICATIONS

International Search Report and the Written Opinion dated Oct. 25, 2016 From the International Searching Authority Re. Application No. PCT/NL2016/050353. (9 Pages).

*Primary Examiner* — Tulsidas C Patel
*Assistant Examiner* — Thomas K Quigley

(57) ABSTRACT

System for power generation from a flow of fluid, comprising a fluid driven device connected to a tether wherein the tether is coupled with a base station to convert energy from the flow of fluid into transportable energy, wherein the fluid driven device comprises a frame provided with adjustable vanes, and wherein the vanes are adjustable for setting into a predefine position relative to the flow of fluid. The fluid driven device comprises a working mode and a retraction mode, wherein in the working mode the vanes are set in a first predetermined position to generate a lift force from the flow of fluid, and wherein in the retraction mode the vanes are set in a second predetermined position to provide a low drag level to the flow of fluid, and wherein the work (Continued)

performed during working mode is larger than the work supplied during retraction mode.

16 Claims, 9 Drawing Sheets

(51) Int. Cl.
  *F03B 15/02* (2006.01)
  *F03B 13/26* (2006.01)
  *F03B 17/06* (2006.01)
  *F03D 5/00* (2006.01)

(52) U.S. Cl.
  CPC .......... *F03D 5/00* (2013.01); *F05B 2240/917* (2013.01); *F05B 2240/921* (2013.01); *F05B 2240/922* (2013.01); *F05B 2240/97* (2013.01); *F05B 2260/406* (2013.01); *F05B 2260/507* (2013.01); *Y02E 10/28* (2013.01); *Y02E 10/70* (2013.01); *Y02E 10/728* (2013.01); *Y02E 60/17* (2013.01)

(58) Field of Classification Search
  USPC ........................................ 290/42, 43, 53, 54
  See application file for complete search history.

(56) References Cited

U.S. PATENT DOCUMENTS

| | | | |
|---|---|---|---|
| 10,087,908 B2* | 10/2018 | Kumano | F03B 13/10 |
| 2002/0033019 A1* | 3/2002 | Mizzi | F03B 17/00 60/398 |
| 2008/0272599 A1* | 11/2008 | Lok | F03B 13/26 290/53 |
| 2009/0015014 A1* | 1/2009 | Devaney | F03B 13/264 290/53 |
| 2009/0212562 A1* | 8/2009 | Jaugilas | F03B 13/26 290/42 |
| 2010/0295302 A1* | 11/2010 | Martin | F03B 17/06 290/43 |
| 2012/0086210 A1* | 4/2012 | Gray | F03D 5/00 290/55 |
| 2012/0093644 A1* | 4/2012 | Croughs | F03B 13/1815 416/1 |
| 2012/0119501 A1* | 5/2012 | Yeomans | F03B 13/264 290/54 |
| 2012/0212350 A1* | 8/2012 | Magnell | F03B 13/10 340/850 |
| 2013/0069368 A1* | 3/2013 | Park | F03B 13/16 290/53 |
| 2014/0212286 A1* | 7/2014 | Borgesen | F03B 13/264 416/8 |
| 2017/0167468 A1* | 6/2017 | Toran | F03B 17/06 |

* cited by examiner

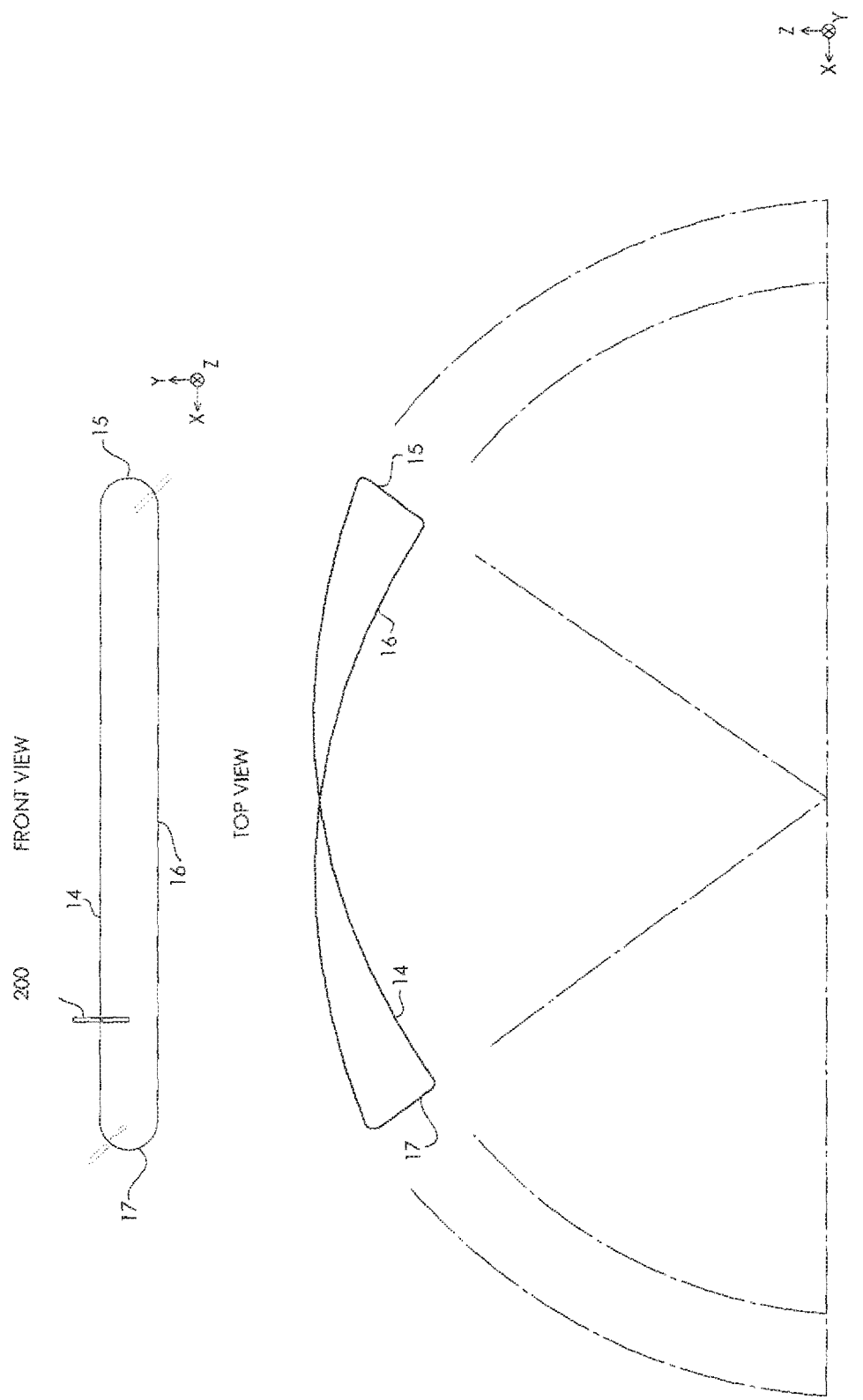

METHOD AND SYSTEM FOR ENERGY CONVERSION FROM A FLOW OF FLUID

RELATED APPLICATIONS

This application is a National Phase of PCT Patent Application No. PCT/NL2016/050353 having International filing date of May 18, 2016, which claims the benefit of priority of Netherlands Patent Applications Nos. 2014816 filed on May 18, 2015, and U.S. Pat. No. 2,014,817 filed on May 18, 2015. The contents of the above applications are all incorporated by reference as if fully set forth herein in their entirety.

FIELD AND BACKGROUND OF THE INVENTION

The invention relates to a system for energy conversion from a flow of fluid into transportable energy, comprising a fluid driven device connected to a tether wherein the tether is coupled with a base station.

Energy demand for human consumption has significantly increased over the last decades and it has been forecasted that, due to growth of the world population, energy demand will further grow. Energy, according to the definition of physicists, can neither be created nor consumed or destroyed. However, energy may be converted or transferred to different forms. These forms can be, for example mechanical or electrical energy. At present a significant portion of the supplied mechanical and electrical energy is based on energy conversion by means of combustion of fossil fuels. These fossil fuels have been developed in billions of years and it has been predicted that mankind is utilizing them in a period of a few hundred years. Besides the problem that we will run out of fossil fuels at a certain moment, investigations show that combustion of fossil fuels contributes significantly to air pollution and the production of greenhouse gas. Due to the production of greenhouse gasses it has been projected that the Earth's surface temperature could exceed historical analogs affecting most ecosystems on Earth.

As a way forwards, it is proposed to save these valuable fossil resources for purposes that fully rely on fossil fuels and that alternative forms of energy, preferable renewables such as wind, sun and tidal energy are being used for purposes that have a less direct demand for fossil fuels such as, for example, production of electricity.

Even though renewable energy has been recognized as a resource for global energy demand, due to the nature of renewable energy, there are a number of issues to tackle. One of them is that the amount of energy available is restricted. Furthermore the number of locations available for harvesting renewable energy is limited. From this it can be concluded that if renewable energy has to make a significant contribution to the worlds energy demand, the need is brought forward to convert renewable energy at available locations with the highest possible conversion rate. An additional challenge is that the price of renewable energy has to be at such a level that a transition from conventional energy to renewable energy can be borne by the market. This brings forward the additional requirement that conversion has to be cost-effective.

Humans have converted energy from a flow of fluid, for example wind or moving water, since mankind. Energy conversion from moving water has many similarities to energy conversion from wind. However, differences are that, the density of water is about one thousand times greater than the density of air, and in general the velocities of moving water are less than those of wind, and water streams, such as tidal and Gulf streams, are more predictable than those of wind. Further differences are found in the velocity profiles of wind and water streams. For example, it is known that the flow of fluid of tidal currents is not homogenous and that the flow is a complex interaction of several processes. Wave-induced eddies at the sea surface and eddies created by the seabed have a significant effect on the velocity profile of tidal currents causing practical problems for converting energy from these types of moving water bodies.

US2002/004090948A1 Apr. 11, 2002 by inventor Gary Dean Ragner discloses a conversion system wherein multiple airfoil kites in tandem are attached by means of control lines and support lines to a control housing. The control lines can change length to control the airfoils kites' angle-of-attack, pitch angle, direction of flight, and flight speed. The length of control lines are controlled from ground station to adjust the airfoils' direction to follow a specific flight path. Control lines and support lines are also wound on a power shaft in control housing. The control of this known system is complex and due to the long control cables the system is difficult to control. Due to the requirement to reel them in and out the cables are subjected to extensive tear and wear which is introducing frequently inspection and maintenance activities. Furthermore, due to the inability of this known system to make short radius turns, the system is operated with a digit eight or an oval shaped trajectory resulting in a large energy leakage. Also, due to controlling the airfoil kites in tandem, it is not possible to adjust the angle-of-attack of each airfoil kite individually. This is disadvantageous as, due to the long string of kites, the apparent direction of flow experienced by the individual kites is different to each other.

Besides that next to the aforementioned system other types of systems are known that are able to convert energy, all the known systems suffer from a number of disadvantages:

a) The known systems have a low conversion rate and as a result the majority of the available energy remains untouched. At present, the common way of mitigating these disadvantages is to install multiple systems in series. The function of the systems installed downstream of the first system is merely to compensate for the weak performance of the first system. It goes without saying that the cost of developing such a row of systems is much higher than the installation of a single system that is able to convert the available energy in one go.

b) The known systems suffer furthermore from a low efficiency caused by significant losses during conversion and transfer of the converted energy. As the converted energy most of the time is consumed at a remote location, the losses during transfer of energy have a significant impact on the system performance.

c) Components used in the known systems are subjected to extensive tear and wear and/or the systems have been designed such that inspection and maintenance is complex and expensive.

SUMMARY OF THE INVENTION

It is an object of the invention to provide an alternative to this and other known systems. It is a further object of the invention to improve prior art and to provide a system and method for energy conversion which is relatively efficient. It is still a further object of the invention to provide a system and method for energy conversion which is easy to control and maintain.

These and other objects and advantages of the invention which will become apparent from the following disclosure, are provided by the system, base station and method according to any one of the appended claims.

SUMMARY OF THE INVENTION

In a first aspect of the invention, the system for energy conversion from a flow of fluid comprises a fluid driven device, a tether and a base station, whereby the fluid driven device is coupled to the tether, and the tether is coupled with the base station, wherein the fluid driven device is provided with at least two adjustable vanes, a first and a second vane, whereby during use and as seen in the flow of the fluid the first vane and the second vane occupy a position following each other, characterized in that
  a) each of the vanes comprise a leading edge and a trailing edge,
  b) the system comprises a working mode and a retraction mode, whereby
  c) the vanes are arranged in a row along a frame whereby in the retraction mode a leading edge of the first vane is pointing towards a trailing edge of the second vane which is adjacent to the first vane.

Preferably said vanes are independently adjustable with respect to each other. With at least two adjustable vanes energy can be converted from a flow of fluid to a maximum extend, particularly in the preferred arrangement wherein the adjustable vanes can be positioned individually in the optimal angle of attack relative to the apparent flow of fluid direction that each vane is experiencing.

For positioning the adjustable vanes in the optimal angle of attack, it is desirable that the system, preferably the adjustable vanes, are provided with a vane positioning system comprising a flow of fluid direction indicating sensor for determination of an apparent flow of a fluid direction in a vicinity of the adjustable vanes, and a controller receivingly connected to said flow of fluid direction indicating sensor, and an actuator receivingly connected to said controller for changing an orientation of the adjustable vane with reference to the apparent flow of fluid direction caused by control actions of said controller that depend on an apparent flow of fluid direction as measured with the flow of fluid direction indicating sensor in the vicinity of the adjustable vanes.

Although it is preferred that vane positioning system is located inside the vanes, it may also be provided integrated into the frame of the fluid driven device.

As an alternative to a vane positioning system an adjustable vane may be comprising a body, which body is provided with a leading part and with a trailing part wherein the trailing part extends into a relatively sharp extremity in comparison with an extremity of the leading part, and a leading edge that is the foremost edge of the leading part, and a trailing edge that is the rearmost edge of the trailing part, wherein an imaginary straight chord line joins the leading edge and the trailing edge, and an imaginary chamber line that joins the leading edge and the trailing edge, wherein on any point between the leading edge and the trailing edge said chamber line occupies an equal distance between an upper surface and a lower surface of the body, and which chamber line crosses the chord line at a point that is nearer to the trailing edge than to the leading edge so as to arrange that the vane is self-positioning. With self-positioning adjustable vanes the conversion rate of the system is optimized, particularly by arranging that the self-positioning vane positions itself into a desired angle-of-attack relative to the apparent flow of fluid.

For steering the fluid driven device along a predefined path it is preferred that the fluid driven device of the system is provided with at least one adjustable vane whereby the at least one adjustable vane has a first part and a second part, whereby both parts are independently adjustable with respect to each other. It is preferred that the first part and second part have substantially equal dimensions and that the first part and second part are positioned in line with each other.

In connection therewith it preferred that the fluid driven device is provided with a steering system comprising an orientation indicating sensor, and a controller receivingly connected to said orientation indicating sensor, and an actuator receivingly connected to said controller for changing the orientation of the first and second part of the adjustable vane with reference to flow of fluid caused by control actions of said controller that depend on an orientation of the frame as measured with the orientation indicating sensor. It is advantageous if the frame or at least a part of the frame of the fluid driven device comprises a body, which body is provided with a leading part and with a trailing part wherein the trailing part extends into a relatively sharp extremity in comparison with an extremity of the leading part.

With such an adjustable vane, a frame and a steering system the fluid driven device can be easily directed along a predefined path enabling energy conversion from a flow of fluid to a maximum extend and with minimal energy leakage, particularly by arranging that the fluid driven device is able to make short radius turns by simply changing the position of the first and the second part of the vane with respect to each other.

In another aspect of the invention the base station of the system comprises a transformation device and a base structure provided with means for connection of the transformation device wherein the transformation device comprises a hydraulic cylinder. A tether connecting a fluid driven device to the base station can then be connected, through the piston rod to the piston that is movable in the hydraulic cylinder so that movement of the piston causes hydraulic fluid to be displaced in a hydraulic system of which the hydraulic cylinder forms part. This hydraulic fluid can then for instance be used to drive a hydraulic motor that drives an electric generator, or can otherwise be used to make the energy available that is related to the displacement of the hydraulic fluid.

To prevent torsion in the tether and energy losses caused by drag during use of the system, it is preferred that the transformation device comprises a hydraulic cylinder that is provided with a piston rod to which the tether is connectable, and a piston rod rotation control system comprising an orientation sensor for monitoring the orientation of the fluid driven device, and a controller receivingly connected to said orientation sensor, and an actuator receivingly connected to said controller and driving the piston rod to cause that the piston rod and the tether connected to it follows the orientation of the fluid driven device.

The actuator of the piston rod rotation control system is preferably provided with a first and a second side, whereby the first side is attached to the piston rod or to a piston and whereby the second side is connected to a cylinder bottom or cylinder barrel by means of a telescopic tube. As an alternative the piston rod rotation control system may be provided with an actuator that is located outside of the hydraulic cylinder barrel.

For transfer of signals and power from the base station, via the tether, to the fluid driven device is it preferred that the hydraulic cylinder is provided with a rotatable coupling comprising a hollow piston rod, and an inner part whereby the inner part is attached to the hollow piston rod and whereby the inner part is provided with at least one connector for connection of a conductor for transfer of a transportable medium to and from the inner part, and an outer part, whereby the outer part is rotatably mounted on the inner part, and whereby the outer part is provided with a at least one connector for connection of a conductor for transfer of a transportable medium to and from the outer part, and an enclosed section that is in open communication with the inner part so as to arrange that the transportable medium can freely flow to and from the inner part. For keeping the outer part into a fixed position relative to the hydraulic cylinder barrel it is preferred that the outer part is connected to the cylinder bottom or cylinder barrel by means of the telescopic tube.

In another aspect of the invention the base station of the system comprises a transformation device and a base structure provided with means for connection of the transformation device wherein it is preferred that the base structure comprises a stationary inner body that is coupled with a conductor for transfer of transportable energy, and an outer body that is rotatably mounted on the stationary inner body whereby the outer body is provided with a conductor for transfer of transportable energy to and from the transformation device, and an enclosed section that is in open communication with the inner body so as to arrange that the transportable energy can freely flow to and from the stationary inner body. With such a base structure the system can be deployed in a flow of fluid that is changing its direction over time, particularly by arranging that the fluid driven device can rotate freely around the base structure whereby converted energy can be continuously transported and as such the system is able to remain in production when the direction of the flow of fluid is changed over time.

For reducing peak pressures in the hydraulic system of which the base station forms part it is preferred that the base unit is provided with a pulsation damper. It is preferred that the pulsation damper comprises a chamber provided with a connection at or near the bottom of the chamber whereby a top part of said chamber is filled with a gas.

In case the base station is a submerged base station it is preferred that the base station is provided with a mooring, and wherein the base structure comprises an inner part, the mooring comprises an upper part whereby the inner part fits around the upper part. In connection therewith it is preferred that the base station is provided with a flexible conductor for transfer of transportable energy. Such type of energy conductor is desirable to facilitate easy movement of the base station, whereby at least a part of the base station is moveable whilst maintaining the coupling with the flexible conductor. This is particularly important when a submerged base station is brought up to water surface for inspection and maintenance. Particular in this situation it is preferred that the conductor is provided with buoyancy means to keep the submerged conductor floating above the bottom enabling easy handling of the conductor while a part of the base station is moved to a different position.

Although the preferred setup is a base station comprising a transformation device provided with a hydraulic cylinder and a flexible pipe or hose, the transformation device can be of any type of equipment that is capable of transforming a force into transportable energy, for example an electric generator coupled to a cable spool in combination with an energy conductor comprising an electric cable.

In case the system is employed in a flow of fluid that is a flowing water body, it is preferred that the submerged fluid driven device is provided with a buoyancy chamber whereby it is advantageous that the buoyancy chamber is an enclosed section of the vane that contains a buoyant substance. By providing the fluid driven device with a buoyancy chamber, the buoyancy factor of the fluid driven device can be easily adjusted by adding or releasing the buoyant substance. Especially in situations where at a certain moment the velocity of a flow of fluid is zero and the position of the fluid driven device needs to be actively controlled, it is preferred that the fluid driven device is provided with a buoyancy control system comprising a position indicating sensor, and a controller receivingly connected to said position indicating sensor, and at least one buoyancy chamber connected to a pump arrangement, and the pump arrangement receivingly connected to said controller for changing the position of the fluid driven device relative to a bottom or water surface during its use, caused by control actions of said controller that depend on a position of the fluid driven device as measured with the position indicating sensor.

The invention is also embodied in a method for energy conversion from a flow of fluid, by providing a fluid driven device, a tether and a base station, whereby the fluid driven device is connected to the tether, and the tether is coupled with the base station, comprising the steps of:
a) providing the fluid driven device with at least two adjustable vanes, a first and a second vane,
b) providing a working mode and a retraction mode, wherein during the working mode and as seen in the flow of the fluid the first vane and the second vane occupy a position following each other whereby the first vane and the second vane are positioned into a desired angle of attack relative to the flow of fluid.

According to the invention this method is characterized by the steps of providing the fluid driven device with adjustable vanes whereby each of the vanes is comprising a leading edge and a trailing edge, and arranging the vanes in a row along the frame, whereby the vanes are set during a part of the retraction mode in a position whereby a leading edge of a first vane is pointing towards a trailing edge of a second vane which is adjacent to the first vane.

According to another aspect of the method of the invention the fluid driven device is provided with at least one adjustable vane with a first part and a second part, whereby both parts are independently adjustable with respect to each other. One particular aspect of the method of the invention is that at a specific moment during the retraction mode the first part and the second part of the vane are set in an predefined position to each other and relative to the flow of fluid causing the fluid driven device to make a short radius turn enabling the fluid driven device to follow an optimal predefined path whereby a maximum of energy is converted from the flow of fluid with a minimum of energy leakages.

By setting the vanes into the preferred positions during the working mode and retraction mode, the work performed by the system during working mode is larger than the work supplied to the system during retraction mode and as such net power is delivered. Controlling switching over from the working mode to the retraction mode and vice versa can simply be done by changing the position of the vanes.

Preferably in the working mode a distance of the fluid driven device to the base station increases whereas said distance of the fluid driven device to the base station decreases when in the retraction mode. In combination with setting the vanes to the appropriate position in the working mode and in the retraction mode, this makes possible that the working mode and the retraction mode can continuously and swiftly alternate.

According to another aspect of the invention the method is characterized by providing the base station with a transformation device comprising a hydraulic cylinder and connecting the tether to the piston of the hydraulic cylinder causing hydraulic fluid to be displaced from the hydraulic cylinder into a hydraulic system where the hydraulic cylinder forms part.

According to another aspect of the invention the method is characterized by the steps of providing the base station with a transformation device comprising a hydraulic cylinder that is provided with a piston rod rotation system, and attaching the tether to the piston rod of the hydraulic cylinder, and aligning the tether to the movements of fluid driven device by measuring the orientation of the fluid driven device and correspondingly turning the piston rod and so preventing torsion and drag losses in the tether.

According to another aspect of the invention the method of the invention is characterized by providing the base station with a transformation device and a base structure wherein said base structure comprises a stationary inner body, and an outer body that is rotatably mounted on the stationary inner body, and an enclosed section that is in open communication with the inner body and outer body so as to arrange that the transportable energy can freely flow to and from the stationary inner body and outer body, whereby the fluid driven device can freely rotate around the base structure and is following the flow of fluid direction that is changing over time.

According to another aspect of the method of the invention the method is characterized by providing the base station with a flexible conductor for transfer of transportable energy, whereby the base station or at least a part of the base station is moveable whilst maintaining the coupling with the flexible conductor.

With the system and method of the invention, energy can be converted from a flow of fluid to a maximum extend and the converted energy can efficiently be transported from the base station to a distant location. The distant location is for instance an artificial or natural island where ancillary equipment can be placed for converting the harvested energy into electrical energy and whereby the electrical energy can, without much loss, be transported over large distances, particularly although not exclusively in the form of DC current. Furthermore electrical energy can be easily tailored to the preferably used means of transport by arranging a suitable voltage level, or even by converting AC to DC or DC to AC.

BRIEF DESCRIPTION OF THE SEVERAL VIEWS OF THE DRAWINGS

The invention will hereinafter be further elucidated with reference to the drawing of an exemplary embodiment of a system according to the invention that is not limiting as to the appended claims.

In the drawing:

FIG. 9 shows a typical trajectory of the fluid driven device of the system according to the invention.

Whenever in the figures the same reference numerals are applied, these numerals refer to the same parts.

DESCRIPTION OF SPECIFIC EMBODIMENTS OF THE INVENTION

In the following description, Z defines a horizontal flow of fluid direction, X a horizontal direction perpendicular to the flow of fluid direction and Y defines a vertical direction perpendicular to the flow of fluid direction.

Figure 1:
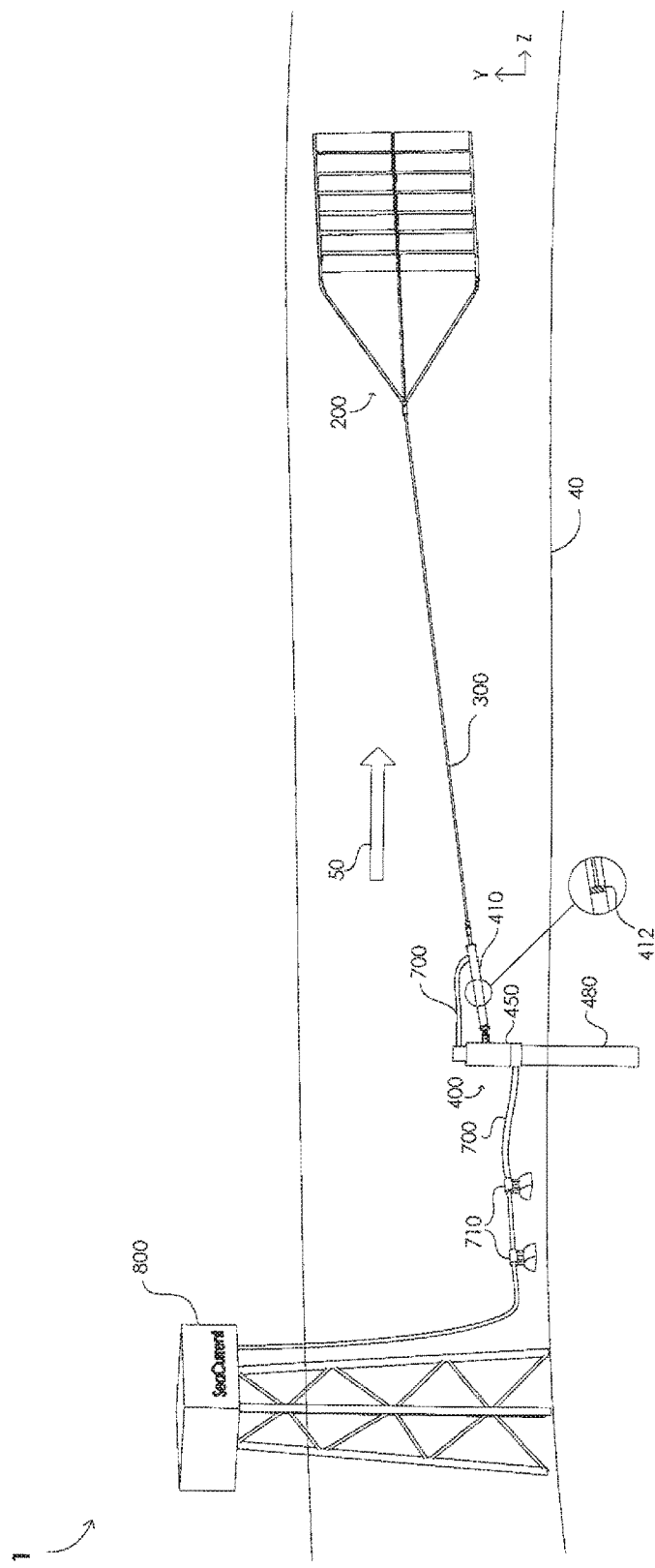
FIG. 1 shows a system for energy conversion according to the invention.

FIG. 1 shows a system denoted with reference 1 which is used to convert energy from the flow 50 of fluid into transportable energy. The system 1 comprises a fluid driven device 200 connected to a tether 300 wherein the tether 300 is coupled with a base station 400. The base station 400 is attached or attachable to a mooring 480 that is located at a bottom of a sea, river, lake, etc.

Preferably the base station 400 is provided with a transformation device 410 comprising at least one hydraulic cylinder. In connection therewith the tether 300 is preferably connected to a piston 412 that is movable in the hydraulic cylinder so that movement of the piston 412 causes hydraulic fluid to be displaced in a hydraulic system of which the hydraulic cylinder forms part. It goes without saying that there may be several hydraulic cylinders with connected tethers 300 and fluid driven devices 200 operating in parallel.

The or each hydraulic cylinder is connectable to a conductor 700 for transferring hydraulic fluid to a distant location where in this exemplary embodiment platform 800 is located. The hydraulic cylinder is connectable or connected to a hydraulic system (not shown) for converting hydraulic energy into electrical energy, and the required means therefore are preferably arranged on the platform 800.

It is preferred that the conductor 700 comprises a flexible pipe or hose for transfer of the hydraulic fluid and that the conductor 700 is provided with buoyancy means 710.

Although the hydraulic cylinder and flexible pipe or hose are preferred features, the transformation device 410 can be of any type of equipment that is capable of transforming a force into transportable energy, for example an electric generator coupled to a cable spool in combination with an energy conductor comprising an electric cable.

Figure 2:
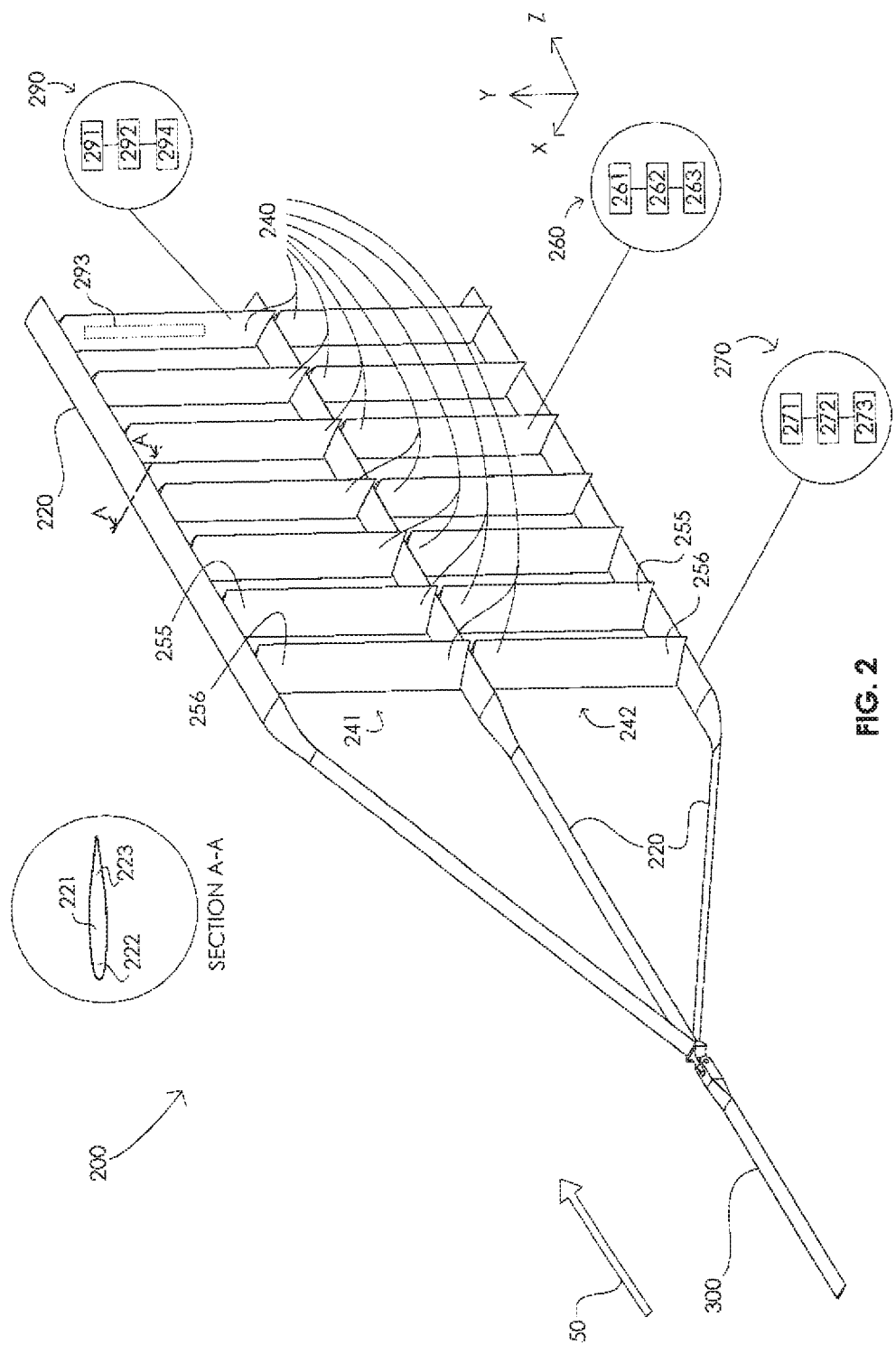
FIG. 2 shows a perspective view of a fluid driven device.

Referring now to FIG. 2, a perspective view of a fluid driven device 200 is shown, wherein said fluid driven device is provided with adjustable vanes 240. The fluid driven device 200 is provided with at least two adjustable vanes 240, a first 255 and a second 256 vane, wherein optionally said vanes 240 are independently adjustable with respect to each other, and wherein during use and as seen in the flow 50 of the fluid the first vane 255 and the second vane 256 occupy a position following each other. It is preferred that the vanes are arranged in a row along a frame 220, however alternative constructions for securing the adjustable vanes 240 in the preferred position to each other are possible as long as these constructions enable the vanes to be operated in tandem.

For positioning of the adjustable vanes 240 into the desired angle of attack relative to the flow 50 of fluid, it is preferred that the system in general, preferably the adjustable vanes 240, are provided with a vane positioning system 260 comprising a flow of fluid direction indicating sensor 261, and a controller 262 receivingly connected to said flow of fluid direction indicating sensor 261, and an actuator 263 receivingly connected to said controller for changing the orientation of the adjustable vanes 240 with reference to the apparent flow of fluid caused by control actions of said controller that depend on an apparent flow of fluid direction as measured with the flow of fluid direction indicating sensor 261. For clarity of the drawing only one vane positioning system 260 is indicated.

For steering the fluid driven device along a predefined path it is preferred that the fluid driven device 200 of the system 1 is provided with at least one adjustable vane 240 which has a first part 241 and a second part 242, whereby both parts are independently adjustable with respect to each other. It is preferred that the first part 241 and second part 242 have substantially equal dimensions and that the first part 241 and second part 242 are positioned in line with each other.

In connection therewith it preferred that the fluid driven device is provided with a steering system 270 comprising an orientation indicating sensor 271, and a controller 272 receivingly connected to said orientation indicating sensor, and an actuator 273 receivingly connected to said controller for changing the orientation of the first 241 and second part 242 of the adjustable vane 240 with reference to apparent flow of fluid caused by control actions of said controller that depend on an orientation of the frame 220 as measured with the orientation indicating sensor 271. It is advantageous if the frame 220 or at least a part of the frame 220 of the fluid driven device comprises a body 221, which body 221 is provided with a leading part 222 and with a trailing part 223 wherein the trailing part 223 extends into a relatively sharp extremity in comparison with an extremity of the leading part 222.

Preferably a submerged fluid driven device 200 is provided with buoyancy chamber 293 whereby it is preferred that the buoyancy chamber 293 is an enclosed section of the vane 240 that contains a buoyant substance.

For controlling the position of the fluid driven device in case the velocity of the flow of fluid is zero, it is preferred that the fluid driven device 200 is provided with a buoyancy control system 290 comprising an position indicating sensor 291, and a controller 292 receivingly connected to said position indicating sensor 291, and at least one buoyancy chamber 293 connected to a pump arrangement 294, and the pump arrangement 294 receivingly connected to said controller for changing the position of the fluid driven device 200 relative to a bottom 40 or water surface 42 during its use, caused by control actions of said controller 292 that depend on a position of the fluid driven device 200 as measured with the position indicating sensor 291.

Figure 3:
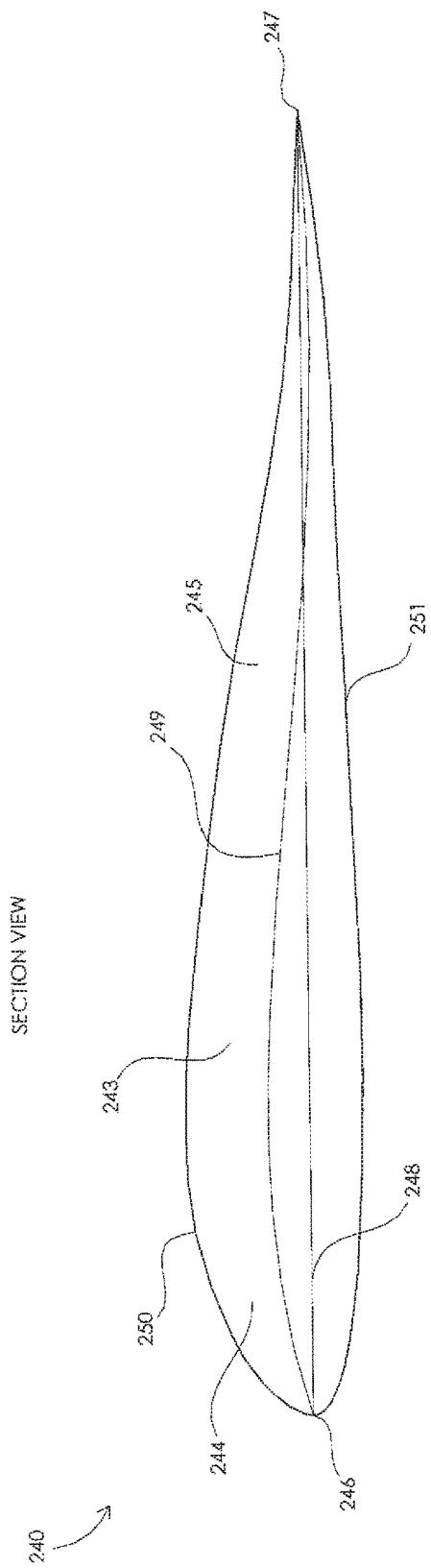
FIG. 3 shows a section view of a vane that is self-positioning.

As an alternative to the earlier mentioned vane positioning system 260, the fluid driven device may be provided with adjustable vanes 240 that are self-positioning. Referring now to FIG. 3 a section view of an adjustable vane 240 is shown comprising a body 243, which body 243 is provided with a leading part 244 and with a trailing part 245 wherein the trailing part 245 extends into a relatively sharp extremity in comparison with an extremity of the leading part 244, and a leading edge 246 that is the foremost edge of the leading part 244, and a trailing edge 247 that is the rearmost edge of the trailing part 245, and an imaginary straight chord line 248 joining the leading edge 246 and the trailing edge 247, and an imaginary chamber line 249 that joins the leading edge 246 and the trailing edge 247 whereby on any point between the leading edge 246 and the trailing edge 247 said chamber line occupies an equal distance between an upper surface 250 and a lower surface 251 of the body 243, and which chamber line 249 crosses the chord line 248 at a point that is nearer to the trailing edge 247 than to the leading edge 246 so as to arrange that the vane is self-positioning.

Figure 4:
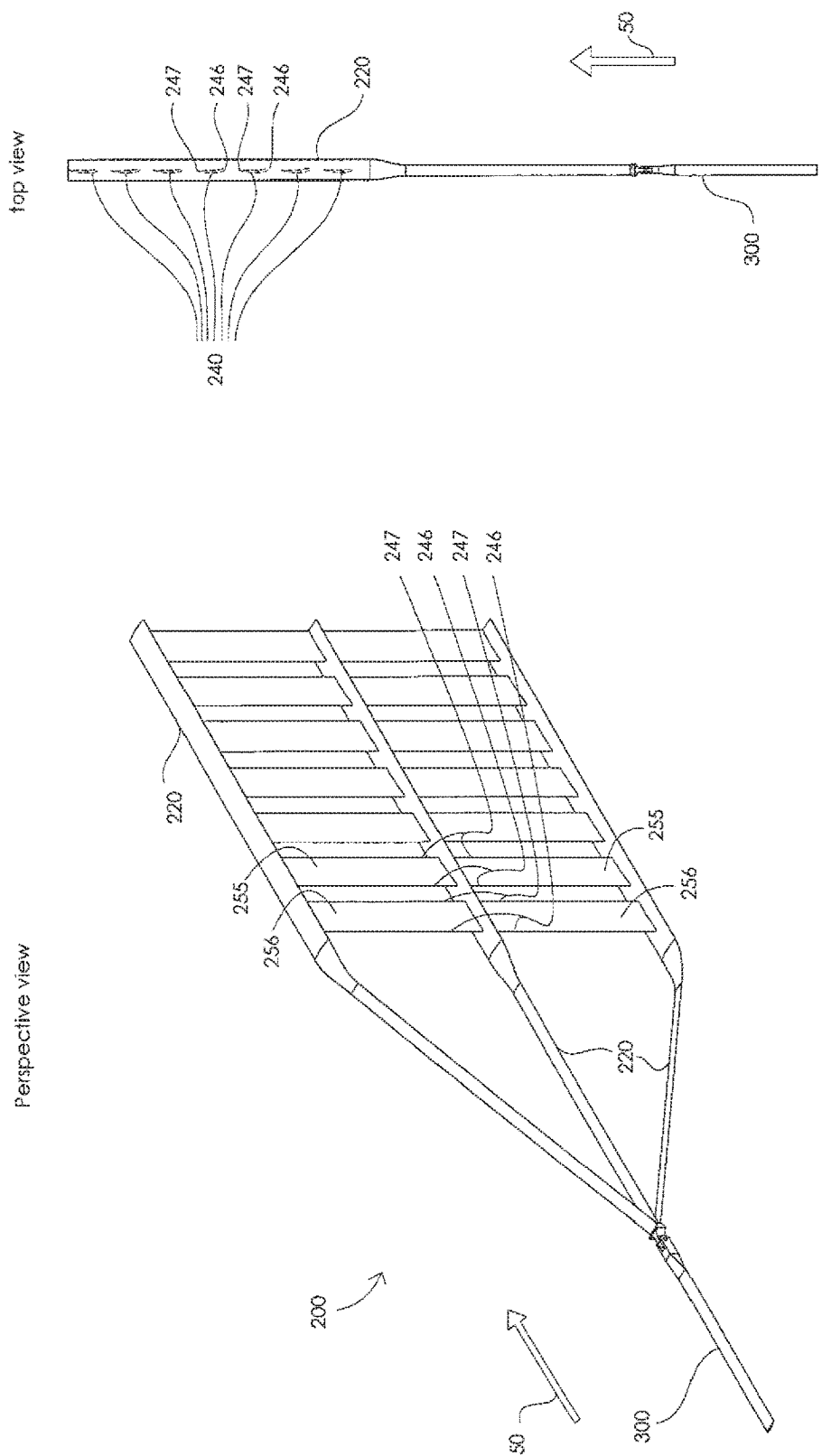
FIG. 4 shows a perspective and top view of a fluid driven device during retraction mode.

It is preferred that the system 1 comprises a working mode and retraction mode. Referring now to FIG. 4 a perspective view and top view of a fluid driven device 200 is shown that is provided with adjustable vanes 240 whereby each of the vanes comprise a leading edge 246 and a trailing edge 247, and whereby the vanes 240 are arranged in a row along the frame 220 whereby in the retraction mode a leading edge 246 of a first vane 255 is pointing towards a trailing edge 247 of a second vane 256 which is adjacent to the first vane 255.

Figure 5:
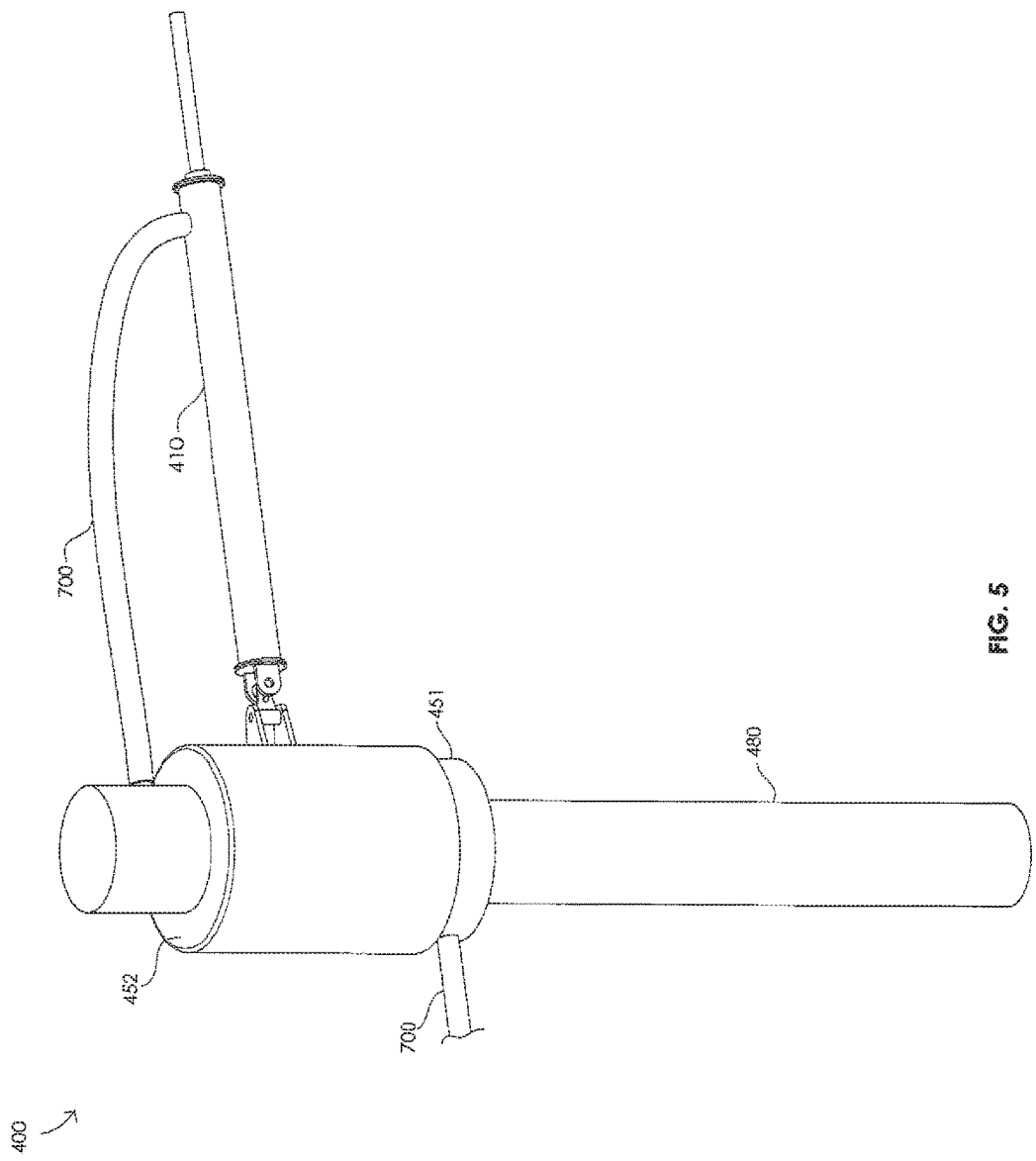
FIG. 5 shows a perspective view of a base station.
Figure 6:
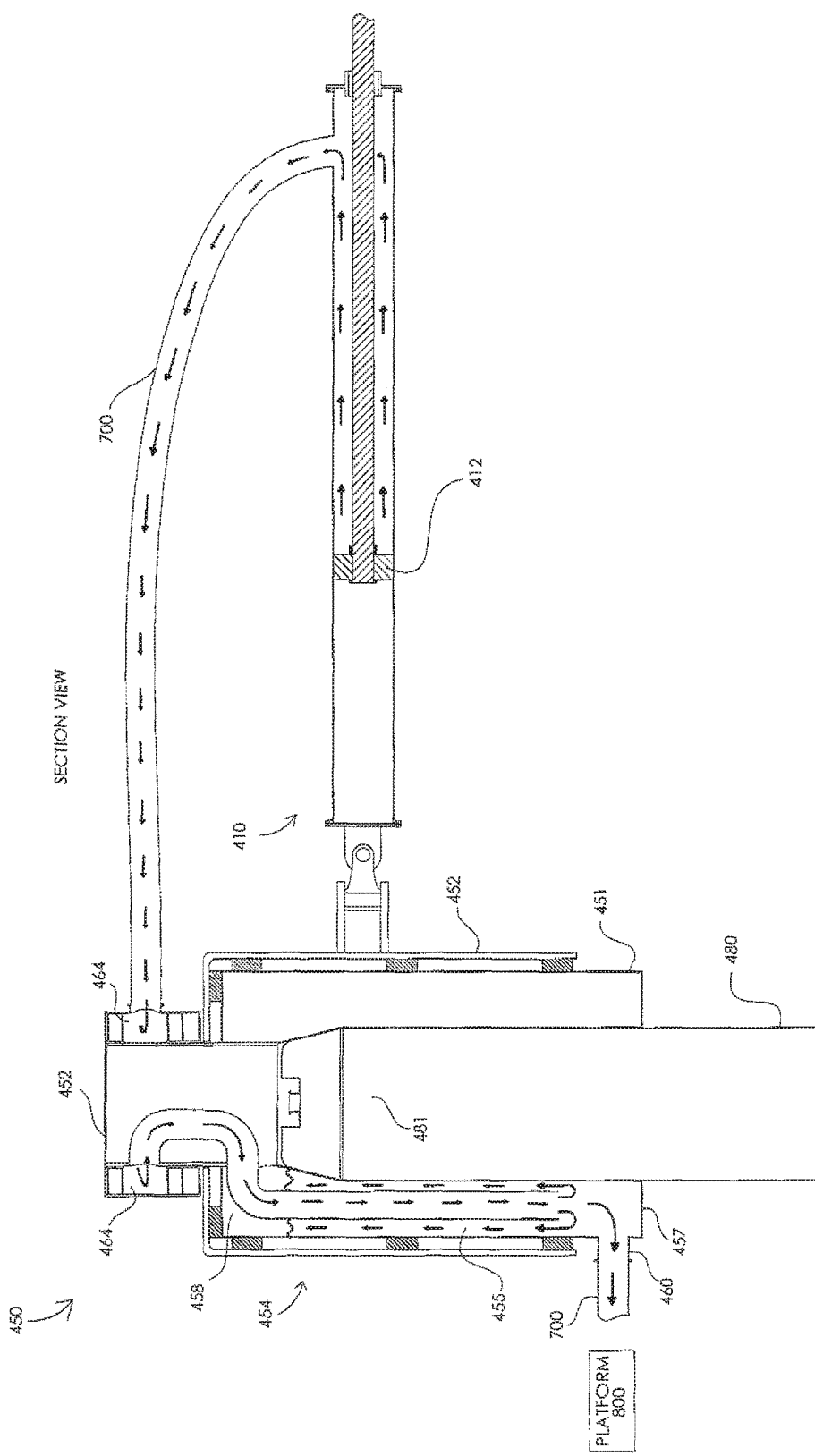
FIG. 6 shows a section view of the base station whereby a fluid flow path is indicated when hydraulic fluid is displaced from the transformation device.

Referring now to FIGS. 5 and 6 a perspective and section view of the earlier mentioned base station 400 are shown, comprising a transformation device 410 and a base structure 450 provided with means for connection of the transformation device 410 wherein the base structure 450 comprises a stationary inner body 451 that is coupled with at least one conductor 700 for transfer of transportable energy, and an outer body 452 that is rotatably mounted on the stationary inner body 451, and whereby the outer body 452 is provided with at least one conductor 700 for transfer of transportable energy to and from the transformation device 410, and an enclosed section 464 that is in open communication with the inner body 451 so as to arrange that the transportable energy can freely flow to and from the stationary inner body 451.

It is preferred that the base station 400 is provided with a mooring 480 whereby it is advantageous that the inner part 451 of the base structure 450 fits around an upper part 481 of the mooring 480.

It is advantageous if the base structure 450 is provided with a pulsation damper 454 whereby it is preferred that the pulsation damper 454 comprises a chamber 455 provided with a connection 460 at or near the bottom 457 of the chamber 455 whereby a top part 458 of said chamber 455 is filled with a gas for reducing peak pressures in the hydraulic system of which the pulsation damper 454 forms part.

FIG. 6 shows a fluid flow path for the case that hydraulic fluid is displaced from the transformation device 410 via the base unit 450 to the platform 800.

Figure 7:
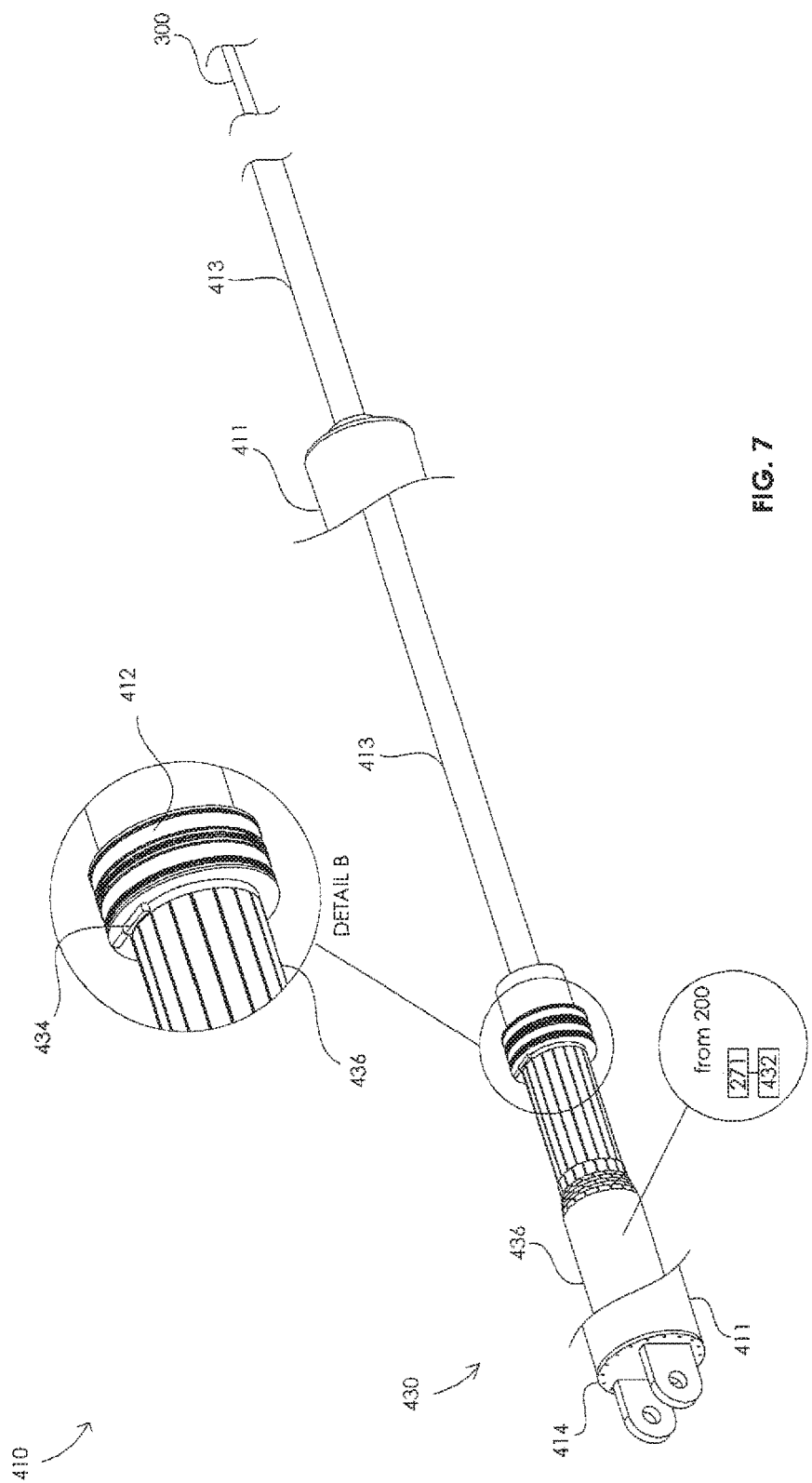
FIG. 7 shows a transformation device provided with a piston rod rotation control system.

Referring now to FIG. 7 where is shown a transformation device 410 provided with a piston rod 413 to which the tether 300 is connectable, and a piston rod rotation control system 430 comprising an orientation sensor 271 for monitoring the orientation of the fluid driven device 200, and a controller 432 receivingly connected to said orientation sensor 271, and an actuator 434 receivingly connected to said controller 432 that drives the piston rod 413 to cause that the piston rod 413 follows the orientation of the fluid driven device 200 and the tether 300 connected to it. It is preferred that the actuator 434 comprises a first and a second side, whereby the first side is attached to a piston rod 413 or to a piston 412 and whereby the second side is connected to a cylinder bottom 414 or cylinder barrel 411 of the transformation device 410 by means of a telescopic tube 436.

Figure 8:
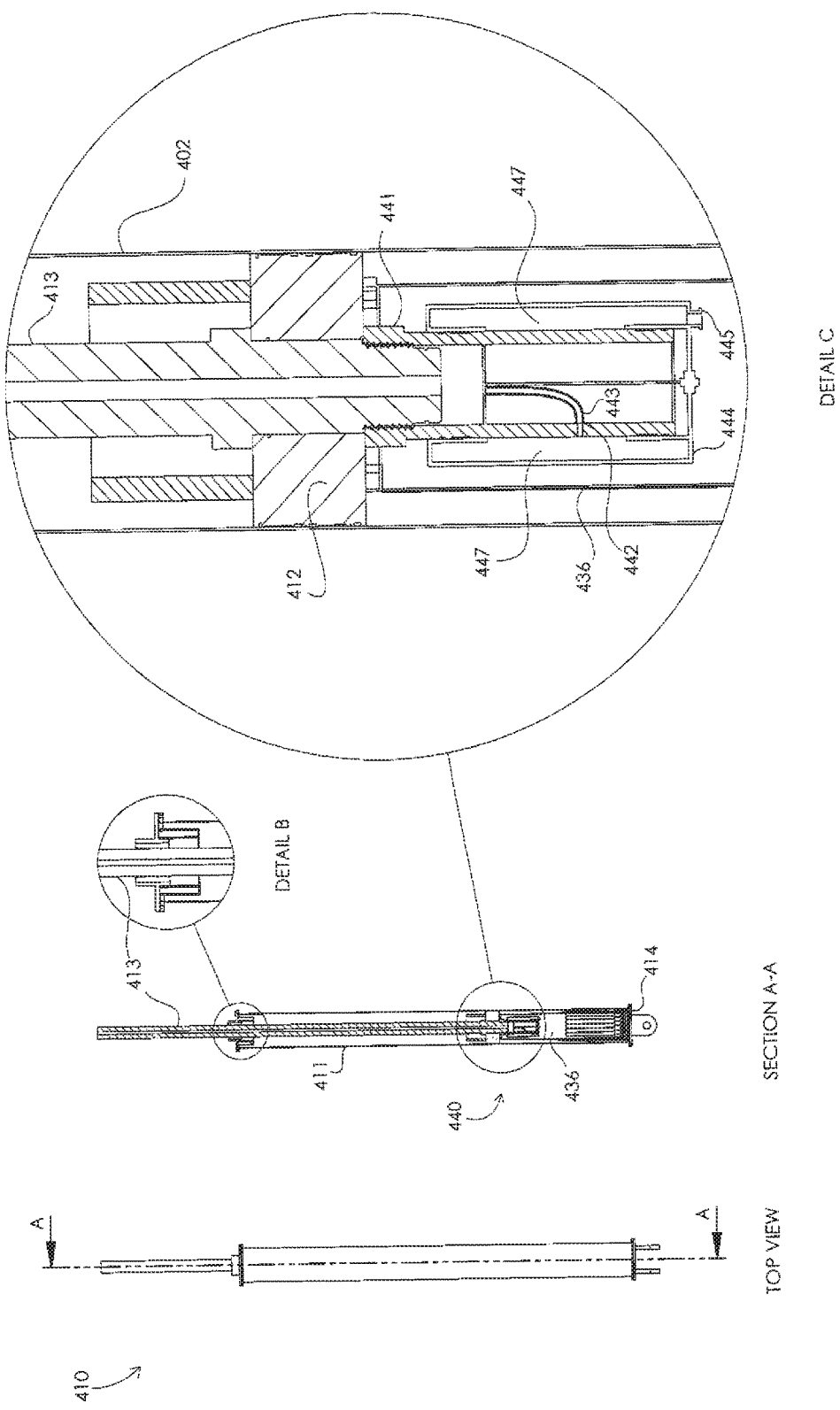
FIG. 8 shows a transformation device provided with a rotatable coupling.

Referring now to FIG. 8 where is shown a transformation device 410 comprising a hydraulic cylinder provided with a rotatable coupling 440 comprising a hollow piston rod 413, and an inner part 441 whereby the inner part 441 is attached to the hollow piston rod 413 and whereby the inner part 441 is provided with at least one connector 442 for connection of a conductor 443 for transfer of a transportable medium to and from the inner part 441, and an outer part 444, whereby the outer part 444 is rotatably mounted on the inner part 441, and whereby the outer part 444 is provided with a at least one connector 445 for connection of a conductor (not shown) for transfer of a transportable medium to and from the outer part 444, and an enclosed section 447 that is in open communication with the inner part 441 so as to arrange that the transportable medium can freely flow to and from the inner part 441. It is preferred that the outer part 444 is connected to the cylinder bottom 414 or cylinder barrel 411 by means of a telescopic tube 436.

Turning back to FIG. 1 and FIG. 2 it is remarked that the system 1 of the invention is particularly suited for executing a method for power generation from a flow 50 of fluid, wherein the fluid driven device 200 is provided with at least two adjustable vanes, a first 255 and a second 256 vane. The method compromises a working mode and a retraction mode, wherein in the working mode the vanes 240 are set into a first predetermined position relative to the apparent flow of fluid, and wherein in the retraction mode the vanes 220 are set into a second predetermined position.

Positioning the vanes 240 into the first predetermined position results in that during the working mode a distance of the fluid driven device 200 to the base station 400 increases. Likewise in the retraction mode said distance of the fluid driven device 200 to the base station 500 decreases. The method is then preferably executed such that the working mode and the retraction mode alternate.

FIG. 9 depicts a first trajectory 14 that is followed by the fluid driven device 200 wherein the vanes 240 are set into the first predetermined position relative to the flow 50 of the fluid whereby it is preferred that the vanes 240 are arranged in a row along the frame 220, and during the working mode and as seen in the flow of the fluid the first vane 255 and the second vane 256 occupy a position following each other whereby the first vane 255 and the second vane 256 are positioned into a desired angle of attack relative to the apparent flow of fluid.

As a result, the fluid driven device 200 that connects through the tether 300 with the piston 412 of the transformation device 410, moves with a steadily increasing distance away from the base station 400. The corresponding movement of the piston 412 causes that the hydraulic fluid in the transformation device 410 propagates into the conductor 700 in order to eventually drive, for instance, a hydraulic motor positioned on the platform 800. The hydraulic motor may be connected to an electrical generator for production of electrical energy.

When the fluid driven device 200 has reached a predefined point which may be its largest excursion away from the base station 400, the vanes 240 are set into the second predetermined position whereby it is preferred that, as further illustrated in FIG. 4, the at least two adjustable vanes 240 provided with a leading edge 246 and a trailing edge 247, are arranged in a row along the frame 220 whereby in the retraction mode a leading edge 246 of a first vane 255 is pointing towards a trailing edge 247 of a second vane 256 which is adjacent to the first vane. It is preferred that during a part of the retraction mode the first part 241 and second part 242 of an adjustable vane 240 are set in a predefined position enabling the fluid drive device to make a short radius turn.

During retraction mode, the piston 412 is caused to retract the fluid driven device 200 to its original position, thereby also causing that the distance between the fluid driven device 200 and the base station 500 is decreased to a predefined distance which may be its shortest distance. During the retraction mode the fluid driven device 200 follows the trajectory 15 until it arrives at the predefined distance with reference to the base station 500, at which time the vanes 220 are set again to the first predetermined position, and the fluid driven device 200 can follow a second trajectory 16 of the working mode. Similarly as with the transition from the first trajectory 14 of the working mode to trajectory 15 of the retraction mode, the second trajectory 16 of the working mode is at a given time followed by another trajectory 17 in the retraction mode of the fluid driven device 200. Trajectory 17 is after its completion followed again by trajectory 14 of the working mode and so on to repeat the process of continuous back-and-forth movement of the fluid driven device 200. Correspondingly the piston 412 of the hydraulic cylinder 410 repeatedly goes back and forth to expel and receive back hydraulic fluid from the hydraulic system comprising conductor 700 connected to the hydraulic cylinder 410, whereby the work performed during working mode is larger than the work supplied during retraction mode.

From the description above, a number of advantages of my improved method and system for energy conversion from a flow of fluid become evident:

the system enables renewable energy conversion from a flow of fluid in a reliable and cost-effective way and will obviate the need of complex and maintenance intensive installations.

the converted energy is transferred with minimum losses to the central power station where it efficiently can be converted into electrical energy. As conversion and transportation losses are minimized, a maximum amount of renewable energy is available for consumption.

the conversion rate of the system is high and kinetic energy of the flow of fluid can be harvested to a maximum extend and in one go, thus avoiding the need for installation of additional conversion units in series.

with the use of an environmentally friendly hydraulic fluid and the feature that the complete installation can be removed if no longer in use without any damage to its surroundings, the system is extreme environmentally friendly.

Accordingly, the skilled person will see that the system of this invention can be used for reliable and cost-effective energy conversion from a flow of fluid, can be installed easily and removed just as easily and without damaging the environment, and can be inspected and maintained without the need for complicated under water activities. In addition, the fluid driven device of the system is extremely maneuverable and can be directed along any never ending predefined trajectory without suffering from energy leakage. Further additional advantages are that:

it enables the production of clean energy from shallow and deep water streams without requiring complicated construction of submerged foundations.

it provides a scalable system that can be tailored to local conditions of any location without the need for complex redesign.

it enables cost-effective energy conversion from a flow of fluid that has a low energy density and as such is expanding the number of possible locations for harvesting of renewable energy at a cost price that can be borne by the market.

Although the invention has been discussed in the foregoing with reference to an exemplary embodiment of the system and method for energy conversion from a flow of fluid according to the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. System (1) for energy conversion from a flow (50) of fluid comprising a fluid driven device (200), a tether (300) and a base station (400), whereby the fluid driven device (200) is coupled to the tether (300), and the tether (300) is coupled with the base station (400), wherein the fluid driven device (200) is provided with at least two adjustable vanes (240) comprising a first (255) and a second (256) vane, wherein said vanes are independently adjustable with respect to each other, whereby during use and as seen in the flow (50) of the fluid the first vane (255) and the second vane (256) occupy a position following each other, characterized in that
    a) each of the vanes (240) comprises a leading edge (246) and a trailing edge (247),
    b) the system (1) comprises a working mode and a retraction mode, whereby
    c) the vanes (240) are arranged in a row along a frame (220) whereby in the retraction mode a leading edge (246) of the first vane (255) is pointing towards a trailing edge (247) of the second vane (256) which is adjacent to the first vane (255)
    d) in the working mode and as seen in the flow (50) of the fluid the second vane (256) is entirely behind the first vane (255) without laterally extending beyond the first vane (255).

2. System (1) according to claim 1, characterized in that the system is provided with a vane positioning system (260) comprising:
    a) a flow of fluid direction sensor (261) for determination of an apparent flow of a fluid direction in the vicinity of the adjustable vanes (240), and
    b) a controller (262) receivingly connected to said flow of fluid direction sensor (261), and
    c) an actuator (263) receivingly connected to said controller (262), the actuator operable to adjust the orientation of the adjustable vanes (240), the adjustment being based on control actions issued to the actuator by said controller, wherein the control actions depend on the determined apparent flow of fluid direction.

3. System (1) according to claim 1, characterized in that at least one adjustable vane (240) comprises:
    a) a body (243), which body (243) is provided with a leading part (244) and with a trailing part (245) wherein the trailing part (245) extends into a relatively sharper extremity in comparison with an extremity of the leading part (244), and
    b) a leading edge (246) that is the foremost edge of the leading part (244), and
    c) a trailing edge (247) that is the rearmost edge of the trailing part (245), and
    d) an imaginary straight chord line (248) joining the leading edge (246) and the trailing edge (247), and
    e) an imaginary chamber line (249) that joins the leading edge (246) and the trailing edge (247) which on any point between the leading edge (246) and the trailing edge (247) occupies an equal distance between an upper surface (250) and a lower surface (251) of the body (243), and which chamber line (249) crosses the chord line (248) at a point that is nearer to the trailing edge (247) than to the leading edge (246) so as to arrange that the vane is self-positioning.

4. System (1) according to claim 1, characterized in that at least one of the at least two adjustable vane (240) has a first part (241) and a second part (242), whereby both parts are independently adjustable with respect to each other.

5. System (1) according to claim 1, characterized in that the fluid driven device (200) is provided with a frame (220) for the adjustable vanes (240), whereby the frame (220) comprises a body (221), which body (221) is provided with a leading part (222) and with a trailing part (223) wherein the trailing part (223) extends into a relatively sharper extremity in comparison with an extremity of the leading part (222).

6. System (1) according to claim 1, characterized in that the base station (400) comprises a transformation device (410) and a base structure (450) provided with means for connection of the transformation device (410), wherein the transformation device comprises at least one hydraulic cylinder (410) for displacing an hydraulic fluid, whereby the tether (300) is connected, through a piston rod (413), to a piston (412) of said hydraulic cylinder.

7. System (1) according to claim 1, characterized in that the base station (400) comprises a transformation device (410) and a base structure (450) provided with means for connection of the transformation device (410), wherein the transformation device (410) comprises a hydraulic cylinder that is provided with a piston rod (413) to which the tether (300) is connectable, and a piston rod rotation control system (430) comprising:
    a) an orientation sensor (271) for monitoring an orientation of the fluid driven device (200), and
    b) a controller (432) receivingly connected to said orientation sensor (271), and
    c) an actuator (434) receivingly connected to said controller (432) and driving the piston rod (413) to cause that the piston rod (413) and the tether (300) connected to it follows the orientation of the fluid driven device (200).

8. System (1) according to claim 1, characterized in that the base station (400) comprises a transformation device (410) and a base structure (450) provided with means for connection of the transformation device (410), wherein the base structure (450) comprises:
    a) a stationary inner body (451) that is coupled with at least one conductor (700) for transfer of transportable energy, and
    b) an outer body (452) that is rotatably mounted on the stationary inner body (451), and whereby the outer body (452) is provided with at least one conductor (700) for transfer of transportable energy to and from the transformation device (410), and an enclosed section (464) that is in open communication with the inner body (451) so as to arrange that the transportable energy can freely flow to and from the stationary inner body (451).

9. System (1) according to claim 1, characterized in that the base station comprises a base structure (450) wherein the base structure (450) is provided with a pulsation damper (454).

10. System (1) according to claim 1, characterized in that the base station (400) is provided with a mooring (480) and wherein the base structure (450) comprises an inner part (451), the mooring (480) comprises an upper part (481) whereby the inner part (451) fits around the upper part (481).

11. System (1) according to claim 1, characterized in that the base station (400) is provided with a flexible conductor (700) for transfer of transportable energy whereby at least a part of the base station (400) is moveable whilst maintaining the coupling with the flexible conductor (700).

12. Method for energy conversion from a flow (50) of fluid, by providing a fluid driven device (200), a tether (300) and a base station (400), whereby the fluid driven device (200) is connected to the tether (300), and the tether (300) is coupled with the base station (400), comprising the steps of:
   a) providing the fluid driven device (200) with at least two adjustable vanes (240) comprising a first (255) and a second (256) vane,
   b) providing a working mode and a retraction mode, wherein during the working mode and as seen in a flow (50) of the fluid the first vane (255) and the second vane (256) occupy a position following each other whereby the first vane (255) and the second vane (256) are positioned into a desired angle of attack relative to the flow of fluid, characterized by the steps of
   c) providing the fluid driven device (200) with adjustable vanes (240) whereby each of the vanes (240) is comprising a leading edge (246) and a trailing edge (247), and
   d) arranging the vanes (240) in a row along a frame (220), whereby the vanes (240) are set during a part of the retraction mode in a position whereby a leading edge (246) of a first vane (255) is pointing towards a trailing edge (247) of a second vane (256) which is adjacent to the first vane (255);
   e) providing that in the working mode and as seen in the flow (50) of the fluid the second vane (256) is entirely positioned behind the first vane (255) without laterally extending beyond the first vane (255).

13. Method according to claim 12, characterized by providing the base station (400) with a transformation device (410) comprising a hydraulic cylinder and connecting the tether to a piston (412) of the hydraulic cylinder causing hydraulic fluid to be displaced from the hydraulic cylinder into a hydraulic system of which the hydraulic cylinder forms part.

14. Method according to claim 12, characterized by the steps of providing the base station (400) with a transformation device (410) comprising a hydraulic cylinder that is provided with a piston rod rotation system (430), and attaching the tether (300) to the piston rod (413) of the hydraulic cylinder, and aligning the tether (300) to the movements of fluid driven device (200) by measuring the orientation of the fluid driven device (200) and correspondingly turning the piston rod (413) so as to prevent torsion and drag losses in the tether (300).

15. Method according to claim 12, characterized by providing the base station (400) with a transformation device (410) and a base structure (450) wherein said base structure comprises a stationary inner body (451), and an outer body (452) that is rotatably mounted on the stationary inner body (451), and an enclosed section (464) that is in open communication with the inner body (451) and outer body (452) so as to arrange that the transportable energy can freely flow to and from the stationary inner body (451) and outer body (452), whereby the fluid driven device (200) can freely rotate around the base structure and is following the flow of fluid direction that is changing over time.

16. Method according to claim 12, characterized by providing the base station (400) with a flexible conductor (700) for transfer of transportable energy, whereby the base station or at least a part of the base station (400) is moveable whilst maintaining the coupling with the flexible conductor (700).

\* \* \* \* \*